April 20, 1937.  H. A. RABATEL  2,078,019
AIRCRAFT
Filed Feb. 26, 1936
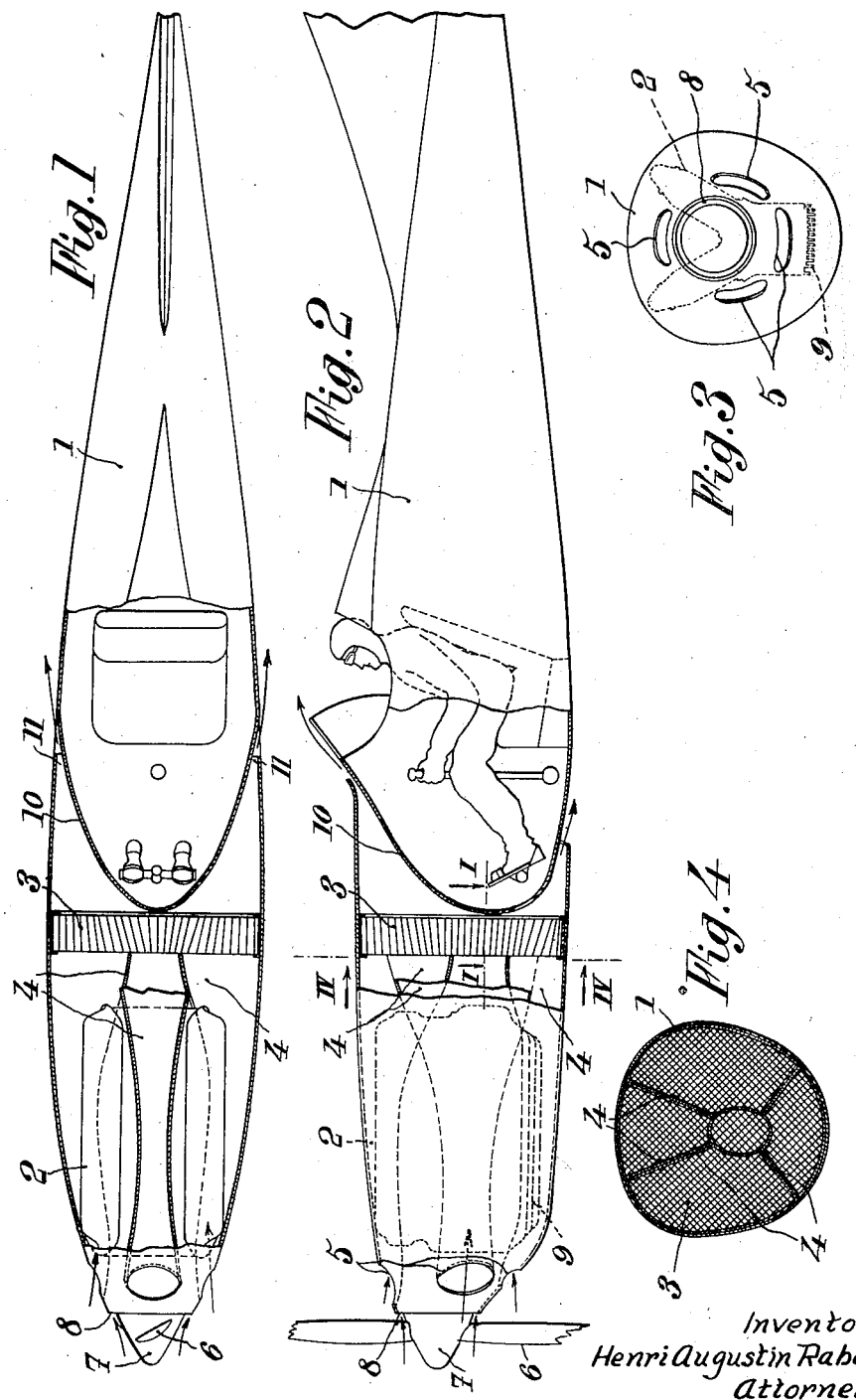
Inventor:
Henri Augustin Rabatel
Attorneys:

Patented Apr. 20, 1937

2,078,019

UNITED STATES PATENT OFFICE 2,078,019

AIRCRAFT

Henri Augustin Rabatel, Paris, France

Application February 26, 1936, Serial No. 65,877
In Belgium March 1, 1935

7 Claims. (Cl. 244—57)

The present invention relates to aircrafts including a motor unit provided with at least one cooling radiator, and it is more especially, although not exclusively, concerned with airplanes.

The object of the present invention is to reduce the head resistance due to the presence of the radiator, or radiators.

The essential feature of the present invention consists in disposing the cooling radiator of an aircraft in which the motor unit is supported by a nacelle or other equivalent streamlined body, at the rear of the motor unit, and, at least substantially, inside said nacelle or other streamlined body.

Other features of the present invention will result from the following detailed description of a specific embodiment thereof.

Preferred embodiments of the present invention will be hereinafter described with reference to the accompanying drawing, given merely by way of example and in which:

Fig. 1 is a plan view, with some parts cut away and some parts in section on the line 1—1 of Fig. 2, of the fuselage of a single engined airplane made according to the present invention;

Fig. 2 is a lateral view, partly in vertical axial section, of the same fuselage;

Fig. 3 is an end view of the fuselage seen from the front;

Fig. 4 is a sectional view on the line 4—4 of Fig. 2.

The airplane according to the present invention which will be hereinafter described by way of example is a single engine airplane including a fuselage 1, at the front of which there is fixed an engine 2, adapted to be cooled through a liquid (water, ethyl, glycol, etc.) in the known manner.

The whole of this airplane, with the exception of the elements thereof which relate to its cooling system, is devised in any suitable manner.

The cooling system comprises at least one radiator located at the rear of the engine, as shown at 3, and preferably wholly inside fuselage 1.

For this purpose, said radiator is advantageously disposed transversely to the fore and aft direction of the fuselage, near the portion thereof which is of maximum cross section, and I provide, to the front and to the rear of said radiator, a system of conduits for the intake and the exhaust of the cooling air.

The system for the intake of air advantageously consists of a plurality of conduits 4 provided, at their front ends, with inlet apertures 5 located close to the front of the fuselage, preferably in a zone of high pressure. These conduits are arranged in such manner as to avoid the various organs contained in the front part of the fuselage and to convey air toward the front face of radiator 3 with the minimum of eddies.

In view of the relatively high speeds of modern airplanes, it will suffice to give inlet apertures 5 a front area corresponding to only a portion of that of the front face of the radiator.

In the case, shown by the drawing, in which engine 2 includes two rows of cylinders arranged in V-shaped fashion, a conduit 4 may, for instance, be placed between the rows of cylinders, two other conduits being provided on the lateral sides of the crankcase of the engine, respectively, and a fourth conduit being disposed under said crankcase.

Conduits 4 are constructed to have a flaring shape in the direction of their rear ends so that adjacent outlet ends rest on each other and form a unit of a cross-sectional size substantially corresponding to the whole area of the inlet face of the radiator, as shown by Fig. 4.

It should be noted that it is advantageous to give the front ends of conduits 4 a direction corresponding to that of the air streams striking the front part of the fuselage. In the case of a tractor propeller 6 located immediately in front of inlet apertures 5, said front ends of conduits 4 are therefore advantageously given a helical shape corresponding to the torsion imparted to the airstreams by the revolving movement of the propeller.

I may further provide an air inlet for the direct inflow of air into the crankcase of the engine so as to cool the latter and to avoid the presence of stationary air zones inside said crankcase.

When the streamlined structure of the fuselage is prolonged toward the front by a streamline nose 7 revolving together with the propeller, this air inlet advantageously consists of a slot 8, of annular or semi-annular shape, provided between the periphery of said nose 7 and the front edge of fuselage 1.

The air flowing in through said slot flows out, in the usual manner, through air holes provided, for instance, at the rear part of the cowling.

It should be noted that this slot 8 may play the part of the inlet apertures 5 above referred to, so as to form the front opening of conduits 4.

In order to improve the cooling of the engine, some portions thereof, for instance the crankcase, may be provided with cooling fins 9 which may be cooled either by air entering through slot 8, or by air flowing through one of the conduits 4 above mentioned, the part provided with these cooling fins constituting, for instance, a portion of the walls of the conduit 4 in question.

The system for evacuating the cooling air that has flown through the radiator may, of course, be made in any suitable manner. Since the velocity of said air is relatively low, the size and form of the passages through which the air flows from the radiator to the atmosphere, are of considerable importance.

According to the present invention, a partition 10 of curved shape is preferably arranged behind the radiator 3 for guiding the air that flows out from the radiator. The convexity of this partition 10 is turned toward the front of the airplane and is devised in such manner as to deflect the air streams issuing from the radiator toward at least some portions of the wall of fuselage 1.

This partition 10 is preferably of a more or less regular ogival or bell shape, and at least the front part of the pilot's cockpit may be disposed in the concavity thereof.

The air issuing from radiator 3 is then guided between the wall of the fuselage and partition 10, so as to be led to outlet holes 11, through which it will flow out in a direction substantially tangentially to the fuselage. Outlet hole 11 may be located near the place where the partition is joined to the wall of the fuselage.

Outlet holes 11 are preferably provided in a zone where there is a considerable drop of pressure, for instance, behind the portion of maximum cross section of the fuselage. Said holes 11 may be given the shape either of an annular aperture extending around the fuselage, or of one or several rows of slots distributed in a suitable manner.

This outlet 11 may also consist of at least one orifice located at the rear end of the fuselage.

Although partition 10 may be devised in any suitable manner, it is of advantage to arrange it so that it acts as a partition for protection against fire as are now provided on all airplanes.

This function of protection against fire is improved by the fact that the radiator, containing a considerable amount of liquid, is interposed between the engine and the cockpit of the airplane. Furthermore, said radiator, owing to the provision of its multiple air passages of small size, acts, in case a fire is started inside the engine cowling, like the wire gauze of a mine lamp and prevents the propagation of the flames toward the rear.

In military airplanes, and especially chasers, partition 10 preferably consists of an armor plate the efficacy of which is very good since bullets striking it in an axial direction have a trajectory which is very oblique with respect to its surface and consequently glance off therefrom.

Finally, radiator 3 may of course be made in any suitable manner, for instance in the form of a plane element of suitable thickness and of transverse dimensions corresponding to the cross section of the fuselage.

This radiator may be disposed immediately adjacent the front of partition 10. The forward portion of this partition may also extend through the radiator, which is then provided with a central opening serving also as the passage of various organs (controls, flexible shafts, tubes, etc.) which connect the engine with the cockpit.

The system above described, the operation of which results clearly from the foregoing explanations, has, aside from the advantages already stated, the following chief advantages:

The pilot's cockpit is heated since partition 10, which limits it at the front, is subjected to the action of an air stream which has been heated by flowing through the radiator. This effect may be increased if some of the hot air is admitted into the cockpit.

Furthermore, it is possible, especially if the air evacuation conduits are extended toward the rear of the fuselage, to heat also the space occupied by the other passengers of the airplane.

Of course, the arrangement according to the invention can be applied also to a nacelle for an engine separate from the fuselage, since it is obvious that such a nacelle could be devised as above explained with respect to the fuselage, the arrangement being applicable to an airplane having a single engine or to an airplane having two or more engines.

Also, it is clear that the invention applies to the case in which the system consisting of the engine, its cowling, one or more radiators 3 and at least the external walls of the air evacuation conduits constitute a single unit, the whole being for instance assembled together so as to be subsequently fixed to the front end of a fuselage the front part of which is constituted by partition 10.

In a general way, while I have, in the above description, disclosed what I deem to be practical and efficient embodiments of the present invention, it should be well understood that I do not wish to be limited thereto as there might be changes made in the arrangement, disposition and form of the parts, without departing from the principle of the present invention as comprehended within the scope of the appended claims.

What I claim is:

1. In an aircraft, the combination of a liquid cooled engine, a fuselage the front part of which encloses said engine, a cooling radiator for said engine located inside said fuselage behind said engine, conduits in said fuselage having at least one opening in the front part of said fuselage and extending rearwardly along said engine to the front face of said radiator for guiding cooling air to said radiator, and a partition of curved shape within said fuselage separating said engine and radiator from the rear of said aircraft and having its convexity turned toward the front of said aircraft, said partition forming an annular chamber with a portion of said fuselage, said chamber having at least one opening toward the outside, the cross section of said chamber tapering toward said opening, said opening being located in a zone of low pressure on said fuselage.

2. A combination according to claim 1 further including a cockpit in said fuselage limited toward the front by the concave face of said partition.

3. A combination according to claim 1 in which said partition is made of a material capable of resisting the heating action of a fire, so as to act as a protection against fire.

4. In a fighting plane, a combination according to claim 1, in which said partition consists of an armor plate.

5. In an aircraft, the combination of a liquid cooled engine, a fuselage the front part of which encloses said engine, a cooling radiator for said engine, located inside said fuselage behind said engine, conduits in said fuselage having at least one opening in the front part of said fuselage and extending rearwardly along said engine to the front face of said radiator for guiding cooling air to said radiator, and means for forming an annular chamber of tapering section, said chamber being substantially located behind said radiator and having outlet apertures extending around the fuselage in a zone of low pressure.

6. In an aircraft, the combination of a liquid cooled engine, a fuselage the front part of which encloses said engine, a cooling radiator for said engine located inside said fuselage behind said engine, conduits in said fuselage having at least one opening in the front part of said fuselage and extending rearwardly along said engine to the front face of said radiator for guiding cooling air to said radiator, and means for forming an annular chamber of tapering section, said chamber being substantially located behind said radiator and having outlet apertures extending around the fuselage behind the portion of maximum cross section of said fuselage.

7. A combination according to claim 5, said conduits being contracted in the middle thereof as in a Venturi tube.

HENRI AUGUSTIN RABATEL.